Patented Oct. 6, 1936

2,056,569

UNITED STATES PATENT OFFICE 2,056,569

TREATMENT OF LATEX

Robert W. Eldridge, Nutley, N. J., assignor, by mesne assignments, to United States Rubber Company, New York, N. Y., a corporation of New Jersey No Drawing. Application June 29, 1934, Serial No. 733,120

8 Claims. (Cl. 18—50)

This invention relates to the treatment of latex and more particularly to methods of exchanging positive ions, such as ammonium, alkali metal, alkali earth metal, heavy or other metal ions, in the latex for various purposes.

In many applications of latex in commercial processes, it is desirable to exchange positive ions that may be present in the latex because naturally occurring, or by virtue of having been added in preserving or compounding operations, for other selected positive ions or to remove such positive ions altogether. In the treatment of fresh latex, for example, ammonia is added to the latex and precipitates naturally occurring alkali-earth metals, such as magnesium, in the form of insoluble salts which may be removed from the latex in the form of a sludge by a centrifugal operation. Such a centrifugal operation necessitates cumbersome apparatus. Latex as preserved in the usual manner with ammonia, may be impractical in subsequent operations as, for example in latex shoe cements, by virtue of the disagreeable effects of the volatile ammonia on operatives handling the material in commercial production. In order to make a non-ammoniated cement, for example, it has been proposed to treat the latex with formaldehyde which converts the ammonia into water soluble hexamethylenetetramine. This tends to destabilize the latex so that the addition of protective agents, which are generally water soluble, is necessary. Such a procedure thus introduces into the cement a water soluble material which is necessarily disadvantageous in the dried cement film. In forming articles directly from latex, a form which is surfaced with a latex agglomerant or coagulant, such as a salt of a bi- or trivalent metal, may be treated with latex, as by a dipping operation, to produce an agglomerated or coagulated thick film on the surface of the form which may be subsequently dried. The inclusion in the dipping surface of a bi- or trivalent metal salt as agglomerant or coagulant, for example, calcium chloride, allows the same to initially dissolve into the latex where the bi- or tri-valent metal ions can react with soaps in the latex to form insoluble soaps but there remains a soluble alkali chloride from the metathesis, by virtue of the alkali originally present in the soap in the latex in the deposition layer. In such a case, therefore, there is no reduction in the molality of water soluble substances in the final article. Such disadvantages of present operations, as above illustrated, are due to present methods of introducing positive ions into the latex for one purpose or another.

The present invention relates to the exchange of positive ions in latex by the treatment of the latex with a class of hydrated basic aluminum silicates, called "zeolites", whose metallic bases (or ammonia base) are easily and reversibly replaceable by other metals (or ammonia).

According to the present invention, positive ions present in the latex may be exchanged for other selected positive ions by treating the latex with zeolites which in the presence of water provide the selected replaceable positive ions. For example, if it is desired to replace ammonia in latex by sodium, it is only necessary to treat the ammoniated latex with sodium zeolite, whereby ammonium zeolite will be formed and the sodium ions will replace the ammonium ions in the latex. In order to regenerate the sodium zeolite, as is well known, it is only necessary to immerse the thus treated zeolite in an aqueous solution of a sodium salt such as sodium chloride and the sodium will replace the ammonium in the zeolite. In a like manner ammonium ions may replace sodium ions in a fixed alkali preserved latex, for example, by treating the latex with an ammonium zeolite. As other illustrations of this base exchange reaction, alkali ions in latex, such as ammonium or alkali metal ions, may be replaced by alkaline earth ions or other metal ions, such as copper, manganese, nickel, ferrous iron, zinc, lead and the like. The replacing of such alkali ions in the latex by alkaline earth or other metal ions may, of course, produce secondary reactions in the latex, as for example, precipitation of alkaline earth or other metal soaps in the latex, which may advantageously thicken the latex, or such exchange may produce an agglomeration or coagulation of the latex depending on the ingredients in the latex at the time of treatment with such alkaline earth or other metal. In these various base exchange reactions with zeolites in latex, no additional negative ions need be introduced into the latex, as is the case where latex is treated with salts as in prior practices. Also, with the base exchange reactions according to the present invention, the positive ions in the latex are removed by the treatment from the latex and are in effect deposited on the zeolite.

The present invention may advantageously be utilized in the treatment of latex in bulk and also in the preparation of rubber articles directly from latex by deposition on a form or mold.

The following examples of applications of the present invention to specific processes are merely included as illustrations of the invention and are not intended to be construed in any way as limitations of the same.

In the treatment of fresh latex on the plantations, ammonia is added to the latex and a precipitation of alkaline earth (more particularly magnesium) salts occurs, necessitating subsequent centrifuging of the latex to remove the sludge containing the precipitated naturally occuring bases in the latex. According to the present invention, fresh latex may be run through a body of ammonium zeolite and the naturally occurring alkaline earth (magnesium) bases in the latex are replaced by ammonium ions from the ammonium zeolite, forming a magnesium zeolite, for example, and thus removing the magnesium from the latex and eliminating the necessity for a subsequent centrifuging to separate magnesium sludge.

In the treatment of ammonia preserved latex with formaldehyde, as in the manufacture of shoe cements, the conversion of the ammonia into water soluble hexamethylenetetramine necessitates the addition of a stabilizer, such as a fixed alkali, or a sulphonated condensation product of an aromatic hydrocarbon, such as anthracene, naphthalene, etc. with an aliphatic alcohol, such as propyl, iso-propyl, butyl, amyl alcohol, etc., as described above. Such stabilizers are for the most part soluble and thus disadvantageously affect the dried cement film. By the present invention, the ammonium ions in the latex may be replaced by alkali-metal ions by passing the latex through a body of alkali-metal zeolite without tending to destabilize the same and necessitate the addition of stabilizers.

Fixed alkalies, such as sodium or potassium hydroxide, are often added to latex for preservation or compounding purposes. If it is desired to remove such alkali-metal from the latex before use in subsequent operations, it is only necessary to treat the latex with an ammonium zeolite to give a latex free of alkali-metal and containing only the volatile ammonium base.

If desired to reduce the alkalinity and remove the fixed alkali without introducing a volatile alkali, such as ammonia, the latex may be treated with an alkaline earth zeolite, such as calcium zeolite, in which case the latex will probably be thickened by virtue of the precipitation of insoluble calcium soaps as a secondary reaction of the substituting calcium ions reacting with soluble soaps present in the latex.

Ammonia as well as fixed alkali may be removed from latex by treatment with an alkaline-earth zeolite under such conditions that insoluble alkaline-earth soaps from the secondary reaction of the alkali-earth ions and the soap-acid radicals in the latex are precipitated without coagulation of the latex. Such a latex where alkali ions have been removed and replaced by alkaline-earth ions in the formation of insoluble alkali-earth soaps would be a thickened latex. If desired, the precipitated alkaline-earth soaps, such as calcium soaps, may be removed, for example by filtration or centrifuging, thus removing the thickening agent and lowering the fatty acid content of the latex.

A reaction similar to the above may be employed in the formation of rubber articles directly from latex by applying latex to a form at least the surface of which contains a zeolite which acts as an agglomerant or coagulant of the latex, such as calcium zeolite. In treating a form which is made of an alkaline-earth zeolite, or which is coated with such a zeolite in a suitable manner as with an aqueous suspension of the same or in admixture with an adhesive or gelling material, a reduction in the water soluble ingredients of the latex deposit is accomplished. This is distinctly an advantage over the application of latex to a form made of or coated with an alkaline-earth salt, for example calcium chloride, where a reaction occurs at the surface of the form to produce insoluble calcium soap and a soluble alkali chloride. For example, in dipping a form coated with calcium chloride in a sodium hydroxide preserved latex, insoluble calcium stearate is produced at the surface of the form and soluble sodium chloride results, there being no reduction in the molality of water soluble substances. On the other hand, according to the present process, where the form is surfaced for example with calcium zeolite, the sodium stearate is converted into insoluble calcium stearate as above, but the sodium is removed from the latex in the form of sodium zeolite and does not remain in the latex film as sodium chloride as a result of the metathesis, and hence the molality of water-soluble substances in the latex film on the form is reduced.

Various processes utilizing the present invention are more rapid at elevated temperatures and therefore the zeolite, for the treatment of bulk latex, or the form made of or surfaced with zeolite for production of rubber articles directly from latex, may be heated before, during or after the treatment with latex, or the latex, if not itself heat sensitive, can be heated prior to treatment. In all cases, the zeolite employed may be regenerated at will by soaking it in the proper salt solution. Zeolites absorb water when dehydrated and hence this property may be made use of or its effects may be avoided as desired.

The term "latex" in the description and claims is used to designate broadly coagulable dispersions of elastic materials containing positive ions, including artificial dispersions of rubber or rubber-like materials as well as natural latex, which may be preserved or compounded or otherwise treated as desired and which may be in a normal, diluted, concentrated, or purified, condition produced by methods well known in the art. The term "alkali" includes ammonia and alkali-metals such as sodium, potassium and lithium. The term "alkaline-earth metals" includes barium, calcium, strontium and magnesium.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of removing naturally occurring alkaline-earth metals from fresh latex comprising treating the latex with an alkali zeolite.

2. The method of removing ammonia from a latex comprising treating the latex with a zeolite having an alkali-metal exchange base.

3. The method of removing a metallic base from a latex comprising treating the latex with ammonium zeolite.

4. The method of removing alkali from a latex comprising treating the latex with an alkaline-earth zeolite.

5. The method of thickening a latex containing alkali soap comprising treating the latex with an alkaline-earth zeolite.

6. The method of producing a rubber article directly from latex comprising applying the latex to a form at least the surface of which comprises a zeolite having a multivalent-metal exchange base.

7. The method of producing a rubber article directly from an alkali preserved latex comprising applying the latex to a form at least the surface of which comprises an alkaline-earth zeolite.

8. The method of thickening a latex containing alkali soap comprising treating the latex with a zeolite having a multivalent-metal exchange base.

ROBERT W. ELDRIDGE.